April 10, 1928.
L. E. MYERS
1,665,272
DETACHABLE SCROLL SUPPORT
Filed April 16, 1926
3 Sheets-Sheet 1
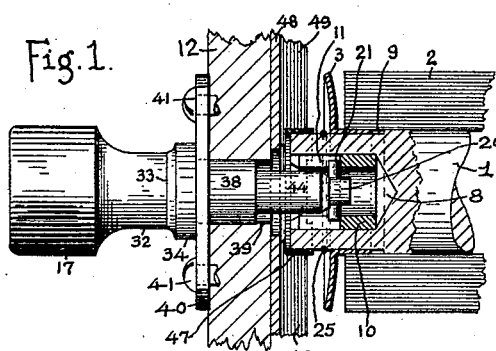
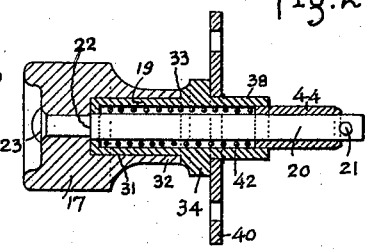
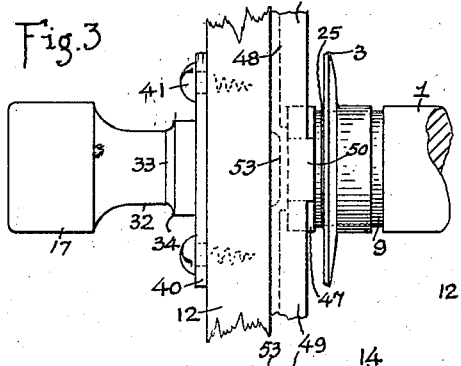
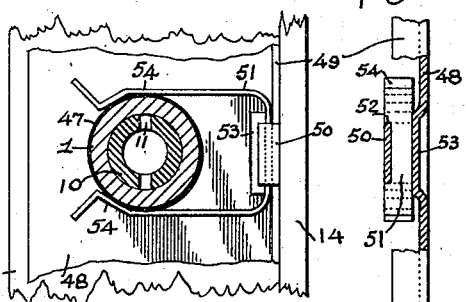
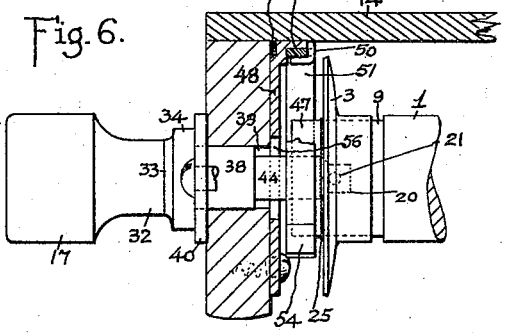
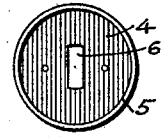
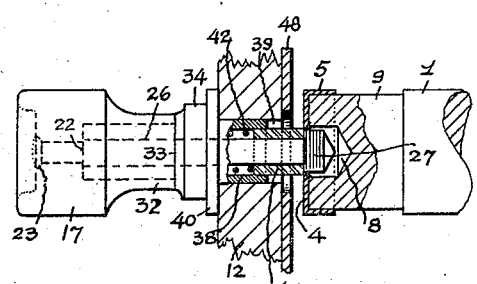
Inventor
Lewis E. Myers
N. S. Amstutz
Attorney

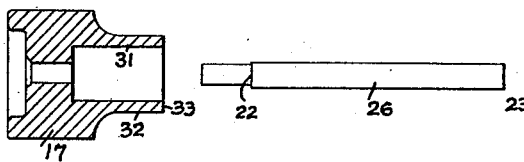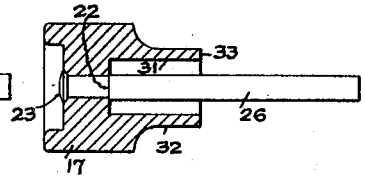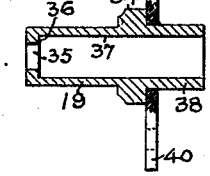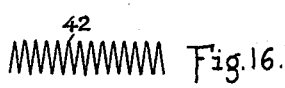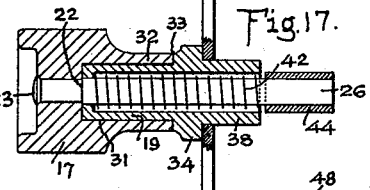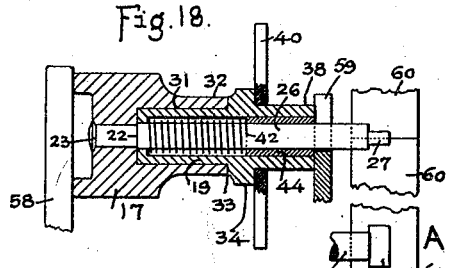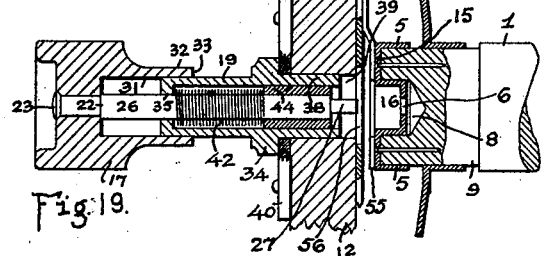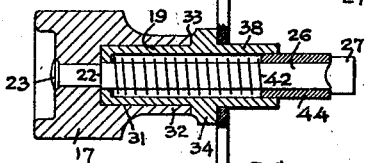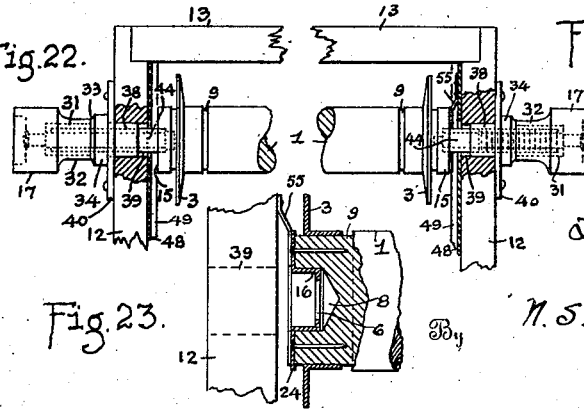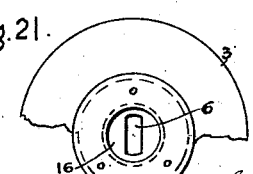

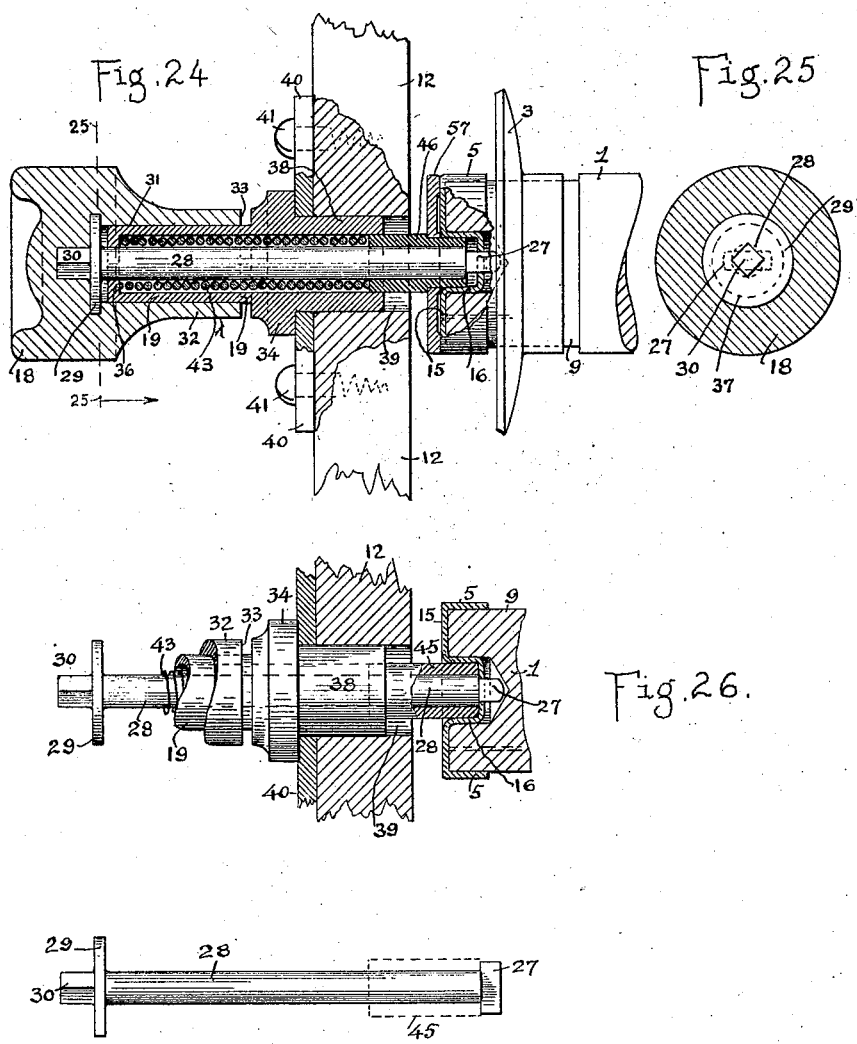

Patented Apr. 10, 1928.

1,665,272

UNITED STATES PATENT OFFICE.

LEWIS E. MYERS, OF VALPARAISO, INDIANA, ASSIGNOR, BY MESNE ASSIGNMENTS, TO THE NORTHERN TRUST COMPANY AND HAROLD H. ROCKWELL AS TRUSTEES.

DETACHABLE SCROLL SUPPORT.

Application filed April 16, 1926. Serial No. 102,595.

My invention relates to improvements in detachable scroll supports and it more especially consists of the features pointed out in the claims.

The purpose of my invention is to provide a simple and compact scroll support; that may readily be attached to old frames; that lends itself to economical production; that in its assembled form constitutes a complete unitary structure; that by simply duplicating the major parts the roller holders may be equally adapted to permanently positioned scroll rollers; that the scroll supports may be operated in conjunction with various types of friction brakes for preventing scrolls unwinding too freely; and that may also utilize different driving means between the support and the scroll rollers.

With these and other ends in view, I illustrate in the accompanying drawings such instances of adaptation as will disclose the broad underlying features of my invention without limiting myself to the specific details shown thereon and described herein.

Figure 1 is an assembled side elevation, partly in section of a support, in engagement with a scroll roller.

Fig. 2 is an elevation in section of a scroll support, detachable from the scroll frame.

Fig. 3 is a rear elevation of one form of spring friction brake.

Fig. 4 is an inside elevation, partly in section, of Fig. 3.

Fig. 5 is a detached edge elevation in section of Fig. 4.

Fig. 6 is a plan view of Fig. 4, partly in section.

Fig. 7 is a plan view of Fig. 6 showing the driving means in section.

Fig. 8 is a detached view of a roller end, in section.

Fig. 9 is an inside elevation of an elongated hole driving cap for scroll rollers.

Fig. 10 is a similar view to Fig. 9 showing a square hole driving cap.

Fig. 11 is a detached sectional view of a knob for turning the scroll rollers.

Fig. 12 is a detached elevation of a driving stem.

Fig. 13 is an elevation, in section, of a knob and stem in assembled relation.

Fig. 14 is a detached elevation in section of a spring barrel bracket.

Fig. 15 is a detached elevation, in section, of a tubular spring collar or sleeve.

Fig. 16 is an elevation of a tension spring.

Fig. 17 is an assembled elevation in section of all the parts shown in Figs. 11 to 16 inclusive.

Fig. 18 is an elevation in section of Fig. 17 showing the steps used to flatten the front end of the stem to form a driving medium and at the same time serve to hold the parts assembled.

Fig. 19 shows a driving support in section, withdrawn from a roller end to permit of the removal of the roller.

Fig. 20 is an elevation in section of a complete unitary roller support in normal driving position.

Fig. 21 is a fragmentary end elevation of a recessed roller cap.

Fig. 22 is a diagrammatic elevation of a roller in its frame and the detachable roller supports.

Fig. 23 is a detached plan view of a roller end in section, showing a spring brake engaging the roller cap flatwise.

Fig. 24 is an enlarged elevation of a roller support in section showing a unitary support adapted to hold a permanent scroll roller also showing a moulded-on knob and a friction brake.

Fig. 25 is an elevation in section on the line 25—25 of Fig. 24 showing a driving stem moulded in the knob.

Fig. 26 is an elevation in section of a modified form of friction brake.

Fig. 27 is a detached elevation of a driving stem flattened at its front end after the related parts, not shown, are assembled.

In practically carrying out my invention into use I may adapt and adopt any desired expedients which lend themselves cooperatively with the several features exemplified herein, to the end that a self-contained unitary structure is produced which, with very minor changes, is equally serviceable for permanent or detachable scroll supports.

It has been found in practice that, owing to a very large demand, rapidity of production, duplication of parts and ease of assembling are outstanding features of first importance. The several figures of the drawing clearly show how these ends are reached. They disclose the successive steps in orderly sequence so that all of the steps which are involved in producing unitary scroll supports can be readily followed.

A description of my invention may be divided into two main sections, such as, the driving mechanism, and the friction features.

Following this order, the driving mechanism may comprise the stems 20 shown in Figs. 1, 2 and 6. These stems have cross pins 21 which may engage slots 11 formed in the bushings 10 which enter recesses 8 at each end of the scroll rollers 1. As a substitute for the stems 20 those shown in Figs. 12 etc., may be used.

Driving stems 26 do not have cross pins, but their front ends are flattened at 27 so as to enter openings in the flanged roller-end caps 4 (Fig. 9), or the flanged recessed caps 15 (Figs. 19 and 21), or the unflanged flat caps 24. Each of these caps have elongated openings 6 to receive the flattened ends 27. The caps 4 and 15 have flanges 5 which pass outside of the roller ends. The recessed parts 16 of the caps 15 pass into the recesses 8 of the rollers 1, similar to the bushings 10 and the caps may be held on the rollers by nails or in any other manner.

The stems 20 and 26 have shoulders 22 at one end which engage the bottom of the bore 31 formed in the reduced diameter 32 of the driving knobs 17 and thus serve to hold the stems and knobs rigidly attached to each other when the stems are riveted to the knobs, at 23, or are otherwise secured to each other.

Another type of driving stem 28 is shown in Figs. 24 to 27 inclusive. These stems may also be flattened at their front end 27. They are set into the knobs 18 while such knobs are being moulded of any suitable cooperating material, such as any of the synthetic condensation products exemplified by phenol-formaldehyde compositions. All the knobs 17 and 18 have knurled exterior surfaces and they all have limiting or abutting front ends 33 formed on the reduced diameter 32. These ends 33 engage the shoulders 34 of the spring barrels 19 thus forming stops to limit the inward thrust of the driving stems, under the pressure of coil springs 42 or 43. These stems 28 are rigidly held in the knobs 18 by means of flanges 29 against endwise movement, and by means of square ends 30 against rotary disengagement. From Fig. 24 it will be seen that the diameter of the flanges 29 is greater than the bore 31 into which the spring barrel 19 passes.

The front or driving ends of the stems 20, 26 and 28 may be formed with cross pins 21, flattened ends 27 or square ends to cooperate with square openings 7 formed in the roller caps (Fig. 10). Any one of these expedients is put into effect after all the parts are assembled. The spring barrels 19 rigid on their plates 40, project into the knobs 17 or 18. The driving stems 20, 26, or 28 pass through openings 35 of the spring barrels and inside of springs 42 or 43 and through short sleeves 44, (Fig. 15) or long sleeves 45 (Fig. 26) or shouldered sleeves 46 (Fig. 24). The flattening of the front ends of the driving stems at 27, may be performed as shown in Fig. 18 by means of two dies 60, while the sleeves 44 etc. are pushed back onto the driving stems by means of a forked member 59 as the knobs are held against an abutment 58 so as to provide clearance for the dies 60.

The friction features may comprise various expedients, such for instance, as the springs 51 (Fig. 4) whose prongs 54 may bear on the flat rings 47 (Fig. 1) in order to hold the rollers 1 against too free rotation, and prevent undesirable slack coming into the scroll 2 as it is moved between two parallel rollers (not shown), or the tension or friction may be applied to one or both ends of rollers 1 by means of flat springs 55 (Fig. 19), or a braking effect may be put onto the scroll rollers by means or disks 57 (Fig. 24) or even by means of the front end of sleeves 45 (Fig. 26) as they engage the recesses 16 of the roller caps. The sleeves 46 and their friction disks 57 as well as the sleeves 45 are pushed endwise by springs 43. As springs 42 press against sleeves 44 they cause the sleeves to frictionally engage the recesses 16 of the heads 15 thus performing the same function as the springs 43 and sleeves 45.

The spring barrels 19 have shoulders or enlargements 34 formed between their ends and the outer ends are closed at 36 to form abutments for springs 42 or 43, seated in the lengthwise chamber 37. Openings 35 in the closed ends 36 admit the endwise sliding movement of whatever type of driving stems may be used. At the inner ends of the spring barrels 19 pilot guiding or self positioning ends 38 are formed. Fastening plates 40 are driven onto the ends 38 so as to become rigid parts of the spring barrels. Screws 41 serve to hold the plates 40 with complete unitary scroll holders assembled thereon, attached to the side members 12 of the complete desk frames (not shown) in which the rollers 1 may be used.

In actual use in many cases the unit scroll holders must be attached to old desks. This requires that a correct alignment be maintained between the attachment and the axis of the old roller position defined by openings 39 through which the stems of former wooden knobs passed. Pilot ends 38, by filling the openings 39 of the side members 12 of a desk frame prevent misalignment of the supports and rollers in assembling the parts on old or new desks. The frame sides are held spaced apart by one or more cross members 13 (Fig. 22) and a backing 14 (Fig. 6). As I do not limit the use of my invention to any specific type of frames these are not shown in detail.

The scrolls 2 may be fastened to the rollers 1 or they may be made attachable and detachable in respect of the rollers. Loose heads 3 on reduced diameter 9 form self adjusting guides for the scrolls 2. If desired, these heads may be kept from accidentally falling off from the rollers when a scroll is removed from its frame and the supporting holders by any well known form of split rings (not shown) that may be slipped into circumferential grooves (not shown) formed between the heads and the ends of the rollers, or the heads may be retained in place by flat bearing rings or end caps 47 (Fig. 1) which may be used instead. When roller end caps 4 or 15 or 24 are used these also prevent the heads 3 slipping off from the rollers.

The friction springs 51 may be fastened to the inside plates 48 by spot welding or otherwise; however, I have shown a mechanical expedient in Figs. 3–6, inclusive, for holding such springs rigidly on the plates 48. This expedient comprises flanges 49 formed lengthwise of the plates to stiffen them. Tongue-like projections 50 extend out from the flanges. Alongside of the projections the body is pressed up at 53 to form seats for the springs 51. The springs themselves have notches 52 on one edge into which the tongues 50 may be pressed and lapped over on the inside of the springs (Fig. 6) to hold them in place so that their prongs 54 will press frictionally on both ends of each roller used, or on only one end of each roller, as desired. Any of the friction devices I have exemplified may be similarly used at only one or on both ends of a roller. The plates 48 have openings 56 through which the driving stems project.

From the description thus far, it will be seen that whatever type of driving stems and knobs etc., are used the parts can be made in duplicate for volume production at small cost. When my scroll holders are used with detachable scrolls the springs 42 have only such a number of coils as will allow the driving stems to be disengaged from the rollers. (Fig. 19.) In this condition the coils are in engagement with each other and they in connection with the flattened ends 27 serve as a stop to prevent the knob and attached driving stem from being pulled out of the spring barrel.

The same kind of a support will also serve to hold a non-removable roller in pivotal relation to a suitable frame by simply increasing the number of coils as shown by spring 43 to almost fill the spring space 37 (Fig. 24). A small amount of clearance is left between the knob end 33 and the shoulder 34 to allow the spring to exert pressure against the roller caps.

It is now clear that with my invention I am able to adapt the same structure of scroll supports to different uses by only increasing the number of coils of the springs 42 as at 43, or in an equivalent way by simply lengthening the sleeves 44, 45 or 46 to shorten the spring space 37 in the spring barrel 19 for the shorter springs 42.

What is claimed is:

1. In unitary scroll holders, a fastening plate, a spring barrel rigidly secured thereto, said barrel having a shoulder between its ends, a spring chamber in the barrel, a stop at one end, a knob slidable and rotatable on the spring barrel, a driving stem rigidly secured to the knob and projecting through the interior of the spring barrel, a coil spring around the stem, a sleeve on the stem in engagement with the spring, and driving means formed on the end of the stem adapted to hold the parts assembled on the stem.

2. In unitary scroll rollers, a spring barrel, a knob rotatable and slidable on the barrel, a stem from the knob passing through the barrel and projecting thereform, a spring on the stem, and means on the stem for limiting the sliding movement of the knob.

3. In scroll holders, a roller, slidable and rotatable stems detachably engaging the ends of the roller, a knob rigidly attached to each stem, hollow spring barrels placed on the stems between the knobs and the roller, means for self-aligning the knobs and spring barrels comprising hollow terminations of the knobs adapted to have rotative and sliding movement on the spring barrels, springs on the stems, and means for limiting the endwise movement of the stems.

4. In unitary scroll rollers, a detachable roller, a spring barrel, a knob rotatable and slidable on the barrel, a stem from the knob passing through the barrel and projecting therefrom, a spring on the stem, means on the stem for limiting the sliding movement of the knob, and friction means controlled by the projecting end of the stem said means being adapted to engage the end of the roller.

5. A roller actuating knob comprising a hollow cylindrical projection, a stem passing through and projecting beyond the opening of the knob, a flange formed on the stem said flange being of larger diameter than the opening of the knob, and a non-cylindrical projection from the flange both the flange and such projection being embedded in the knob whereby the stem is held in fixed relation to the knob for simultaneous endwise and rotative movement therewith.

In testimony whereof I affix my signature.

LEWIS E. MYERS.